Patented Oct. 28, 1924.

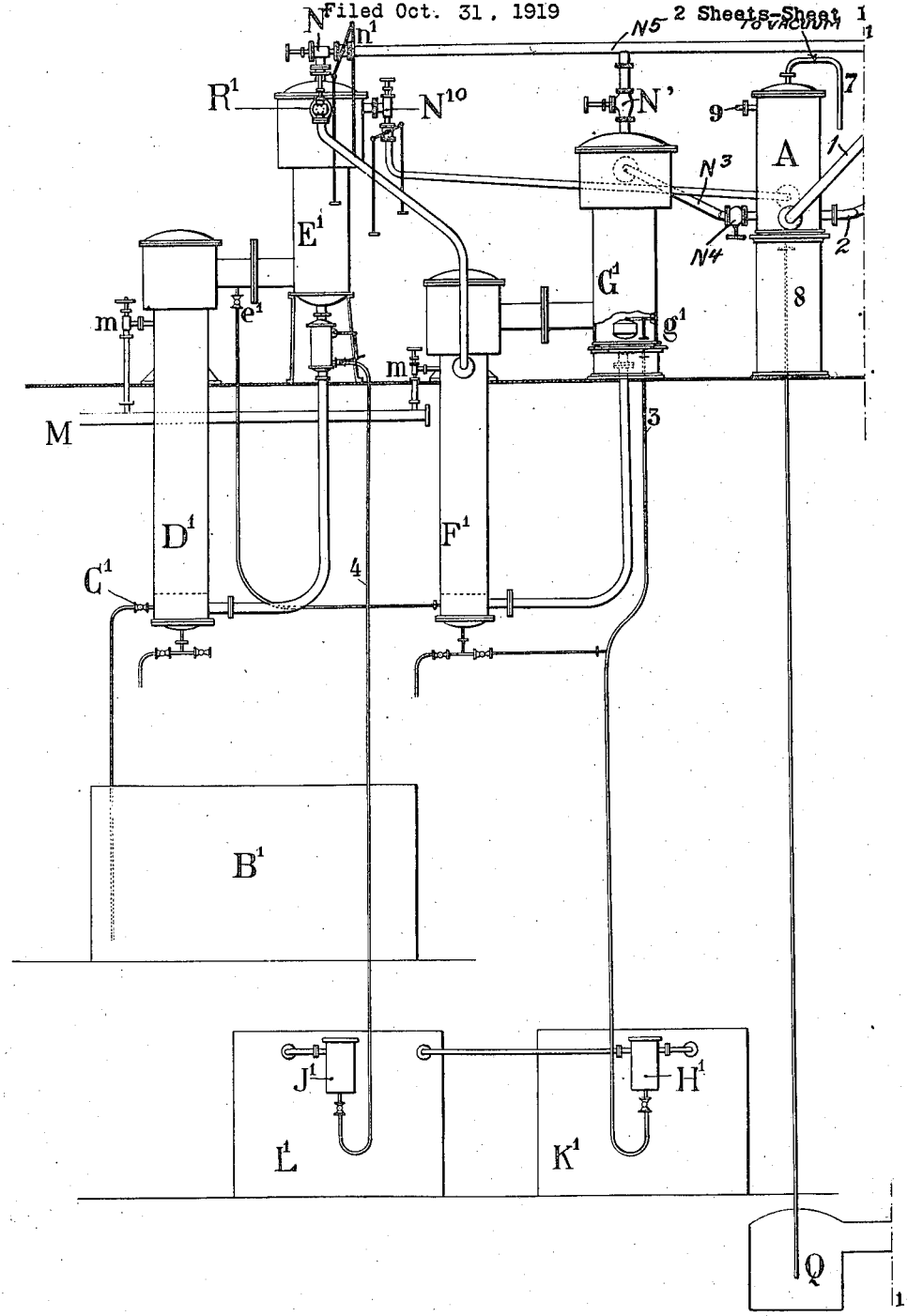

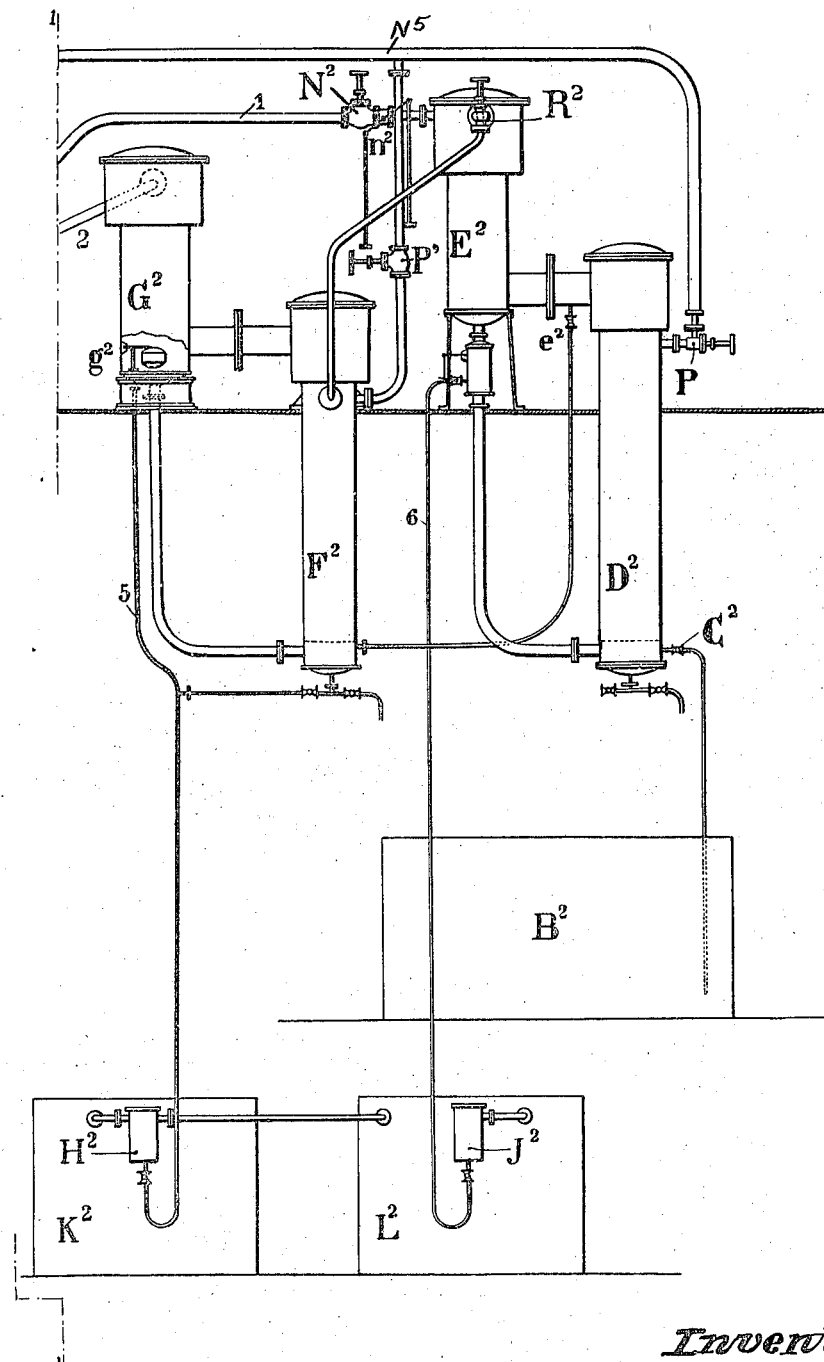

1,513,305

UNITED STATES PATENT OFFICE.

EMILE AUGUSTIN BARBET, OF PARIS, FRANCE.

PROCESS AND APPARATUS FOR CONCENTRATING GRAPE JUICES.

Application filed October 31, 1919. Serial No. 334,848.

*To all whom it may concern:*

Be it known that I, EMILE AUGUSTIN BARBET, a citizen of the French Republic, residing at Paris, France, have invented certain new and useful Improvements in the Processes and Apparatus for Concentrating Grape Juices, of which the following is a specification.

Grape honey is produced quite simply by evaporating in a vacuum the juice of grapes that has been sulphured by the action of sulphurous acid and well clarified. The vacuum enables a low temperature of ebullition to be employed so that all the properties of the fresh juice can be retained in the honey thus obtained, i.e. without destroying the vitamines or coagulating the albumins or lecithenes.

The present invention consists in an improved process for concentrating fruit juices by multiple effect in a vacuum wherein a different juice is treated in each effect, characterized by the fact that one of the juices is subjected to evaporation at a temperature lower than the critical temperature of coagulation of the albumin, lecithenes, and vitamines of the juice.

The invention also consists in improved apparatus for concentrating fruit juice by multiple effect in a vacuum, said apparatus comprising the combination of a first group of evaporating devices treating a portion of the fruit juice to be evaporated by 1st effect of the steam, and a second group of evaporating devices treating a second portion of the fruit juice to be evaporated by 2nd effect of the steam.

For this purpose however it has been hitherto necessary to effect the evaporation by a single effect which entails a very large consumption of fuel.

Further, the passage of the juice through a single concentrating apparatus is attended by two disadvantages, namely:

1. If the sulphited juice which is to be mixed with the stock of boiling syrup in the apparatus is fed directly and continuously, it is practically impossible to draw off continuously a syrup quite free from sulphurous acid. Nevertheless for the sake of facilitating the working, it is necessary that the operation shall be regular, that is to say, continuous both as regards the feeding and the drawing off.

Experience has shown that the concentrated syrup retains for that reason about ⅙ of the initial sulphurous acid. A second apparatus is therefore very desirable because the finished syrup issuing from this 2nd evaporating stage containing ⅙ of the quantity left behind by the first tubular apparatus, is about 1/36, which is a practically negligible proportion.

2. If only one concentrating apparatus is employed, and it is desired to get juice of 38 to 39° Bé., it is generally necessary that the juice from this single concentrator shall boil at 38 to 39° Bé. of concentration. Now the viscosity of such a thick syrup diminishes considerably the coefficient of transmission of the heating steam, and this necessitates the employment of an excessively large heating surface, and consequently a great increase in the cost of the apparatus.

The hereinafter described improved process and apparatus have for their object and result to obviate these disadvantages.

*Evaporation by double effect.*

If it is made a condition never to exceed 55° or even 50° C. as the boiling point of syrup of 38–39° Bé., it is necessary that the steam that is to heat this tubular apparatus in 2nd effect, shall have at the very least a temperature of 70° C. A drop from 70 to 55°=15° C. is not too much for boiling such viscous syrups, especially in view of the low pressure of the heating steam.

It will therefore be necessary that the syrup in the 1st effect shall boil at 72–73° C.— according to its concentration—in order to produce steam of 70° C.

This temperature however cannot be allowed without affecting the freshness of the final product because vegetable albumins become coagulated at 70° C. A remaining trace of sulphurous acid constitutes, it is true, a valuable protection against the production of a "cooked" taste, but the protection is only partial.

It must be noted that all grape syrups do not require such an immaculate freshness according to the commercial purposes for which they are intended.

For instance, many kinds of white grape honey are intended for making jams. Since these jams have to be boiled it does not matter whether the grape juice has been subjected to a temperature of 75° C. or even higher when being first concentrated.

Other kinds of white honey may be used for making wines for distilling brandy, or liqueur wines of the muscat, marsala, malaga, etc. class, where a cooked taste is desired.

On the other hand if the honey of black grapes is intended to be rediluted (which although forbidden in France can yet be done abroad) for the purpose of making up fermented red wines of the normal type, it is necessary in the case of such products never to exceed a temperature of 55° in the boiling, in order to retain not only the freshness of the flavour but also the brightness of the red colour which is easily spoiled by heat.

Consequently white grape honey is concentrated at 72–73° centigrade in the 1st effect on the one hand, and in the 2nd effect on the other hand, red honey is concentrated at 50–55° C. as a maximum.

By this method the manufacturer obtains a double effect of his heating steam. In other words, the concentration of the red honey produced by the vapour given off from the white honey is obtained free of cost. The pecuniary result will be the same to the manufacturer as if each honey had required the consumption of only half of the coal required by the evaporation by simple effect.

This combination does not prevent each of the two effects being constituted by means of two chests connected to each other receiving one and the same heating steam. By this means the disadvantages hereinbefore stated are obviated.

A further advantage is gained, namely, this method allows if desired of eliminating a certain proportion of potassium bitartrate in order to render the final honey less acid.

With this object it is merely necessary to cause the syrup to pass out of the 1st concentration by 28–30° Bé. and to allow it to cool slowly. An abundant precipitation of tartar takes place and the second chest is fed with the supernatant clear syrup. The tartar is collected and washed and constitutes a by-product of great value.

The general arrangement of the improved apparatus is illustrated in the accompanying drawing, the left hand half showing the first effect and the right hand half showing the second effect; each effect being composed of two chests. All analogous parts are arranged symmetrically in relation to the barometric condenser A which is located on the centre line of the drawing. All the reference letters of the 1st effect are provided with the index 1, and all the reference letters of the 2nd effect are provided with the index 2 for the purpose of facilitating the understanding of the drawing.

$B^1$ is the reservoir of white sulphured juice for the 1st effect.

$B^2$ is the reservoir of red sulphured juice for the 2nd effect.

$C^1$ and $C^2$ are cocks fitted with dials for regulating the feed of the 1st and 2nd effects.

$D^1$ and $D^2$ are first tubular heaters for the 1st and 2nd effect.

$E^1$ and $E^2$ are safety separators for the 1st and 2nd effects.

$F^1$ and $F^2$ are second tubular heaters for the 1st and 2nd effects.

$G^1$ and $G^2$ are second separators for the 1st and 2nd effects.

$H^1$ and $H^2$ are traps for the white and red honeys.

$K^1$ and $K^2$ are tanks for receiving the white and red honeys.

$J^1$ and $J^2$ are traps (if desired) for semi-concentrated syrups.

$L^1$ and $L^2$ are tanks for receiving these semi-concentrated syrups.

The heating steam of about 100° C. (exhaust steam of engines) arrives by the pipe M and enters $D^1$ and $F^1$ through the regulating valves $m$ $m$. The vapor generated from the juice by the concentration may pass out from the top of the separators $E^1$ and $G^1$ through pipes having valves N and $N^1$. From these last mentioned pipes this heated vapor travels through the pipe $N^5$ having valves P and $P^1$. These valves control the passage of the heated vapor into the heaters $D^2$ and $F^2$.

The vapor of the red juice passes from $E^2$ into the barometric condenser A through the pipe 1, whilst that of $G^2$ passes to the same condenser through the pipe 2.

*Operation.*

The white juice from $B^1$ undergoes a first concentration in $D^1$ $E^1$, and passes out through the tap $e^1$ on its way to the lower part of $F^1$ $G^1$ where it is raised to about 38–39° Bé. To cause the syrup to pass from $D^1$ into $F^1$, the level in the latter tubular heater is lower than in the former. This passage may be further facilitated by giving 10–20 mm. of mercury absolute pressure more in $E^1$ than in $G^1$ by operating a throttle valve $n^1$ controlling the passage of the vapors. The finally concentrated syrup passes out automatically. The level is kept constant by the operation of an internal float $g^1$. The syrup flows by barometric pressure down the pipe 3, and passes the trap $H^1$ where its density is measured, and it is discharged into the reservoirs $K^1$ or $L^1$.

The trap $J^1$ serves for the case where it is desired to draw off syrup directly from $E^1$ through the pipe 4, especially when it is desired to remove a portion of its tartar by crystallization.

Meanwhile sulphured red juice is sucked up from the reservoir $B^2$ for feeding continuously the devices $D^2$ $E^2$. After the syrup has undergone a first concentration in $D^2$ $E^2$, it passes out through the tap $e^2$ on its way to the second tubular heater $F^2$ $G^2$ wherein the concentration is raised to about 38–39° Bé. The float $g^2$ regulates the outflow of the syrup in such a manner as to maintain a constant level. The syrup descends by barometric pressure down the pipe 5, passes the trap $H^2$, and is discharged into the reservoirs $K^2$ or $L^2$.

A direct drawing off of the syrup in a semi-concentrated condition may be effected by way of the pipe 6, the trap $J^2$ and the tank $L^2$. The two tubular heaters $D^2$ $E^2$ and $F^2$ $G^2$ are heated by the same steam of 70–72° operating as a 2nd effect and derived from the white juice of the 1st effect. Regulation of the white juice vapors used for heating is effected by means of the valves P and $P^1$.

The vapour given off from $E^2$ passes to the barometric condenser A through the pipe 1 that is fitted with the valve $N^2$ and a throttle $n^2$. The vapour that is given off in $G^2$ passes through the pipe 2 to the barometric condenser A.

A pipe 8 serves to carry the lukewarm water from the condenser to the drain Q. The pipe 9 serves for the inflow of cold water. The pipe 7 serves for drawing off the gases; it is connected to a powerful vacuum pump not shown.

The accompanying drawing illustrates the various apparatus located on a high floor so that all the discharges from the condenser A, and the discharges of the various syrups can be effected by barometric pressure, and can be regulated by means of suitable floats. It is to be understood that if it is not desired to build such a high building, special extracting pumps must be installed at all points and their delivery must be adjusted very carefully, which requires much more supervision on the part of the operator.

The above is one manner of working. But the apparatus is so constructed that it can be operated otherwise.

For instance, if there is only white juice to be concentrated, the tubular heaters $D^1$ and $D^2$ may be used as 1st effects, and the tubular heaters $F^1$ $F^2$ as 2nd effects. For this purpose, the valves N $N^1$, $N^{10}$ and $N^2$ $m$ for $F^1$, P and $P^1$ must be closed and the valves $R^1$ $R^2$ and 2 and $N^4$ (in pipe $N^3$) must be opened, steam being admitted to $D^2$ by a pipe not shown Or by means of a pipe not shown, for conveying the syrup from $D^1$ and $F^1$ to $D^2$, the whole of the left hand group may be arranged as a 1st effect, and the final concentration in the 2nd effect will then be carried out in the right hand group. In this case valves N, $N^1$, P, $P^1$ and $m$ $m$ are open, valves $R^1$, $R^2$, $N^{10}$ and $N^4$ are shut. Further, if the honey to be produced is able without inconvenience to be subjected to an initial temperature of 100° C. the working may be effected in triple effect. For this purpose $R^1$, $N^1$, $N^2$, P and $P^1$ must be opened and N, $N^{10}$, $R^2$, $N^4$ and $m$ of $F^1$ must be closed. The vapor will then work successively in $D^1$, in $F^1$, then in the group $D^2$, $F^2$ operating as a third effect. The pipe for taking fruit juice from $F^1$ to $D^2$ $F^2$ is not shown. Finally, if N, $N^{10}$, $m$ for $F^1$, $N^4$, $P^1$ and $N^2$ are closed, and $R^1$, $N^1$, P and $R^2$ are opened, the working will take place in quadruple effect, that is to say, with the maximum economy in evaporation.

If the valve $N^{10}$ is open and the valves N and $R^1$ closed the parts $D^1$ and $E^1$ may act as a single effect alone and then the vapour will pass directly to the condenser N.

If the left hand portion of the apparatus, that is, the portion shown on the first sheet of the drawings is used as a double effect, then the vapors from the separator $E^1$, when the valves N and $N^{10}$ are closed, may pass by way of the pipe having the valve $R^1$ into the heater $F^1$. From the separator $G^1$ of the last mentioned heater, the vapors may pass directly to the barometric condenser A through the pipe $N^3$ providing the valve $N^4$ in said pipe is open and the valve $N^1$ is closed.

It is to be understood that the vapor from the separators $E^1$ and $G^1$ does not pass through the pipes having the valves $N^{10}$ and $N^4$ when said vapor is used for heating the heaters $D^2$ and $F^2$. In such a case the valves $N^{10}$ and $N^4$ will be closed and the vapor of the white juice will pass through the pipe $N^5$ to said heaters $D^2$ and $F^2$.

The industry of producing grape honey must be able to satisfy at will the various requirements of home production or of export from day to day.

If desired the principle of the independence of each evaporator may be carried further to the point of feeding the evaporators with juices of different fruits. For instance, there would be no objection to concentrating apple juice in the 1st effect which would allow of producing white or red grape honey in the 2nd effect at a very low temperature.

What I claim is:—

1. A process for simultaneously concentrating in vacuo, the sulphured juices of white and red grapes, which consists in subjecting the juice of white grapes to a double evaporation, utlizing the heat of the vapours generated for concentrating the red juices by double evaporation, separately cooling and decanting the products of the first evaporation or first syrups of the white and red grapes for the extraction of the potassium bitartrate, and separately feeding the second evaporation of the juices of the white and red grapes with the clear syrups.

2. An evaporating apparatus for concentrating the juices of white grapes and red grapes by multiple effect in a vacuum, comprising the combination of a first evaporating device having vertical tubes for concentrating the juice of white grapes, a device for cooling and decanting the juice concentrated in said first evaporating device, a second evaporating device of the same type for treating the clarified syrup, means for heating the first and second evaporating devices by steam, a third evaporating device of the same type for concentrating the juice of grapes, a device for cooling and decanting the concentrated juice or first syrup from the third evaporating device, a fourth evaporating device for continuing the concentration of the syrup clarified in the third evaporating device, and means for conducting vapor derived from the juices treated in the first and second evaporating devices for heating the juices treated in the third and fourth evaporating devices.

In testimony whereof I have signed my name to this specification.

EMILE AUGUSTIN BARBET.